United States Patent [19]

Alkalay

[11] Patent Number: 5,695,081
[45] Date of Patent: Dec. 9, 1997

[54] UNIFORM SHELVING SYSTEM

[75] Inventor: Uri Alkalay, Even Yehuda, Israel

[73] Assignee: Julius Engineering Ltd., Kaanana, Israel

[21] Appl. No.: 568,175

[22] Filed: Dec. 6, 1995

[30] Foreign Application Priority Data

Dec. 6, 1994 [IL] Israel ............. 111888

[51] Int. Cl.[6] ............................................. A47F 5/00
[52] U.S. Cl. ....................... 211/187; 211/186; 211/188; 108/144; 108/192
[58] Field of Search ................... 211/182, 186, 211/187, 188; 108/144, 180, 186, 187, 192

[56] References Cited

U.S. PATENT DOCUMENTS

| | | | |
|---|---|---|---|
| 3,392,689 | 7/1968 | Ferdinand et al. | 108/144 X |
| 3,675,598 | 7/1972 | Kesilman et al. | 108/144 |
| 4,045,104 | 8/1977 | Peterson | 211/182 X |
| 4,128,064 | 12/1978 | Chung et al. | 108/192 |
| 4,527,490 | 7/1985 | Tipton et al. | 108/192 |
| 4,630,550 | 12/1986 | Weitzman | 108/186 X |
| 4,815,394 | 3/1989 | Ettlinger et al. | 108/144 X |
| 5,048,429 | 9/1991 | Freiberg | 108/192 X |
| 5,218,914 | 6/1993 | Dickinson | 108/192 X |
| 5,433,326 | 7/1995 | Horian | 211/188 |

*Primary Examiner*—Robert W. Gibson, Jr.
*Attorney, Agent, or Firm*—Helfgott & Karas, P.C.

[57] ABSTRACT

A modular shelving system which can be easily assembled and disassembled is disclosed. The system comprises: (1) vertical posts; (2) horizontal beams; (3) side horizontal braces; (4) connectors capable of being mounted on the vertical posts and having 1-4 identical ears protruding from the sides of the connector capable of being coupled to the horizontal beams and braces; and (5) shelf pieces which are positioned on the horizontal beams. The width of the side horizontal braces is substantially similar to the width of the connectors, thus forming one continuous surface.

17 Claims, 12 Drawing Sheets

UNIFORM SHELVING SYSTEM

BACKGROUND OF THE INVENTION

The present invention relates to a totally modular shelving system which is capable of being built in any desired configuration, and is easily assembled and dismantled.

Many types of modular shelving systems are available commercially. The common elements of these systems include: 1) vertical posts; 2) horizontal beams extending both lengthwise and widthwise; 3) connecting elements which connect the beams to the posts; and 4) shelving elements.

A truly modular system is one in which 1) the positions of the various components are completely interchangeable; 2) the distances between the vertical posts (and thus the size of the shelves) is easily and reversibly altered; 3) the shelves can be extended in any direction; 4) there is only one type of each component; and 5) the shelving unit can be easily assembled and dismantled. Although the systems currently available claim to be modular, in truth the number of permutations possible is limited due to drawbacks in the design of the modular elements.

Thus, in some systems, the connector and horizontal beams form one unit, as a result of which the beams cannot be replaced without dismantling the connector from the vertical post. In other systems, the shelves and horizontal beams form one unit so that the shelves cannot be easily replaced. In certain systems, the connections of the lengthwise and widthwise horizontal beams to the posts differ, or there are different types of shelves for placement next to the posts ('end pieces') and away from the ends ('center pieces'). In still other systems, the posts must be distanced one from the other in order to insert or remove the horizontal beams. The above disadvantages and others limit the modularity of these systems.

BRIEF SUMMARY OF THE INVENTION

It is an object of the present invention to provide a shelving system which is completely modular.

It is a further object of the present invention to provide a shelving system which can be extended in all directions, forming an unbroken, continuous shelf surface.

Additionally, it is an object of the present invention to provide a shelving system which is aesthetically pleasing to the eye.

According to the present invention, there is provided a modular shelving system comprising: (1) vertical posts; (2) horizontal beams; (3) side horizontal braces; (4) connectors capable of being mounted on the vertical posts and having 1–4 identical ears protruding from the sides of the connector capable of being coupled to the horizontal beams and braces; and (5) shelf pieces which are positioned on the horizontal beams; wherein the width of the side horizontal braces is substantially similar to the width of the connectors.

In a preferred embodiment of the invention, the widths of the brace and connector are substantially equal.

Further in accordance with the present invention, there is provided a shelving system wherein the height of the side horizontal braces is substantially similar to the height of the shelf pieces when the braces are coupled to the connectors and the shelf pieces are positioned on the horizontal beams.

According to another aspect of the present invention, there is provided a system wherein the height of the connectors is substantially similar to the height of the side horizontal braces when the connectors are mounted on the vertical posts and the braces are coupled to the connectors.

In a most preferred embodiment of the present invention, the connectors, side horizontal braces and shelf pieces are all of the substantially same height, forming one continuous surface.

Although the present invention can be applied to various shelving systems, a preferred application is to the shelving system described and claimed in Applicant's co-pending Israel Patent Application No. 96339.

BRIEF DESCRIPTION OF THE DRAWINGS

The present invention will be better understood from the following detailed description of preferred embodiments, taken in conjunction with the following drawings in which.

DESCRIPTION

Figure 1:
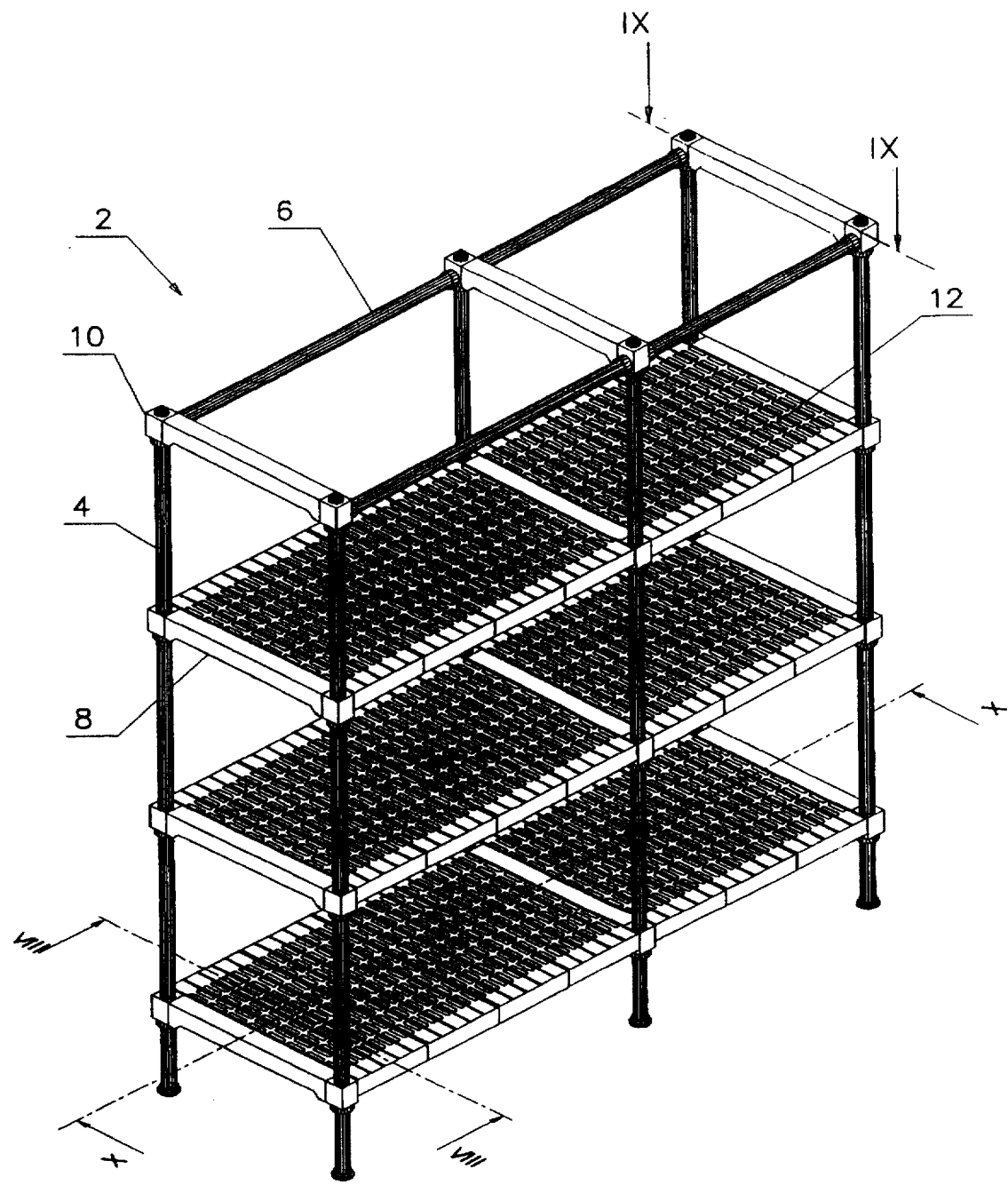
FIG. 1 is a perspective view of a shelving system according to a preferred embodiment of the present invention.

Reference is now made to FIG. 1, in which can be seen a two-unit shelving system according to a preferred embodiment of the present invention, generally designated 2. A number of vertical posts 4 are held together by horizontal supports comprising lengthwise horizontal beams 6 and widthwise side horizontal braces 8. The horizontal beams and braces are attached to the posts 4 by connectors 10, and a number of shelf pieces 12 are positioned on the beams 6. The shelf pieces are generally of standard length and width, and the desired length of the system is obtained by using the appropriate number of shelf pieces. The uppermost level of the system is without shelf pieces in order to reveal the beams. The components of the system can be made from metal or rigid plastic materials. Preferably, the horizontal beams and vertical posts are made from metal, while all of the remaining elements are made from plastic materials.

Figures 2, 3:
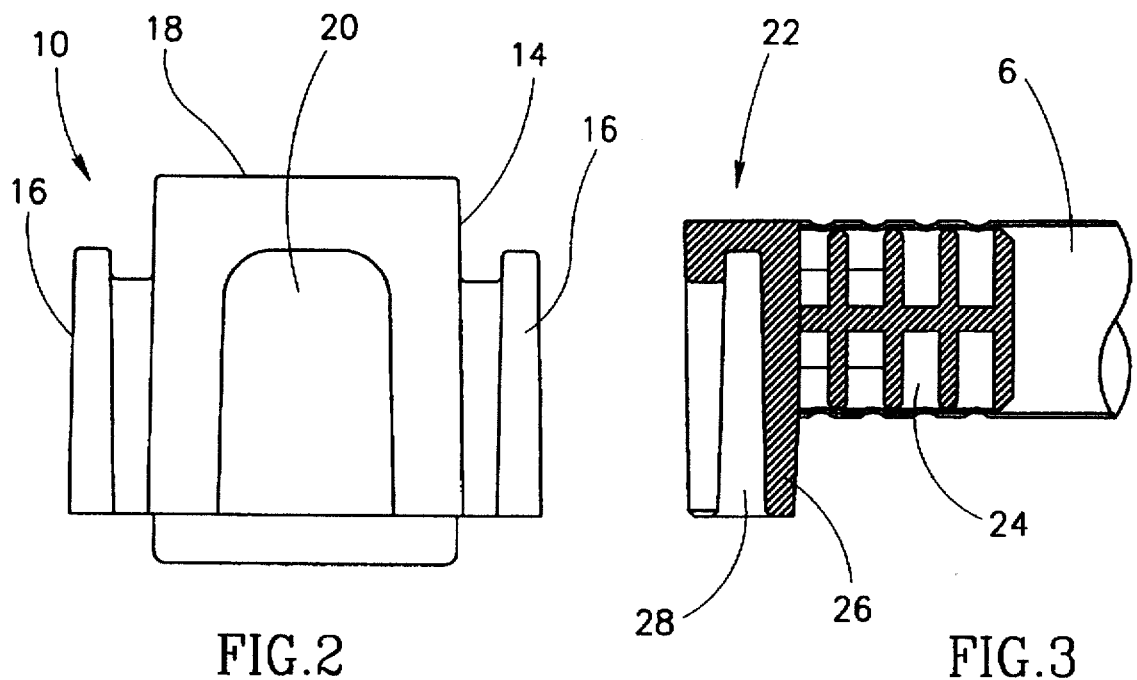
FIG. 2 is a side view of a connector according to one embodiment of the present invention.
FIG. 3 is a sectional side view of an adapter inserted into the end of a horizontal beam, which is shown in a partial, cut-away view.

A connector 10 is illustrated in FIG. 2 as having a square shaped body 14 with projecting ears 16. The ears are of identical shape and can project from one, two, three or all of the sides of the body. The upper surface 18 of the connector is flat, and a slightly conical axial bore 20 extends through the center of the connector. The diameter of the bore at its upper, narrower end is slightly larger than the outer diameter of the vertical post 4. The connector can, of course, be of shapes other than square.

Figure 4:
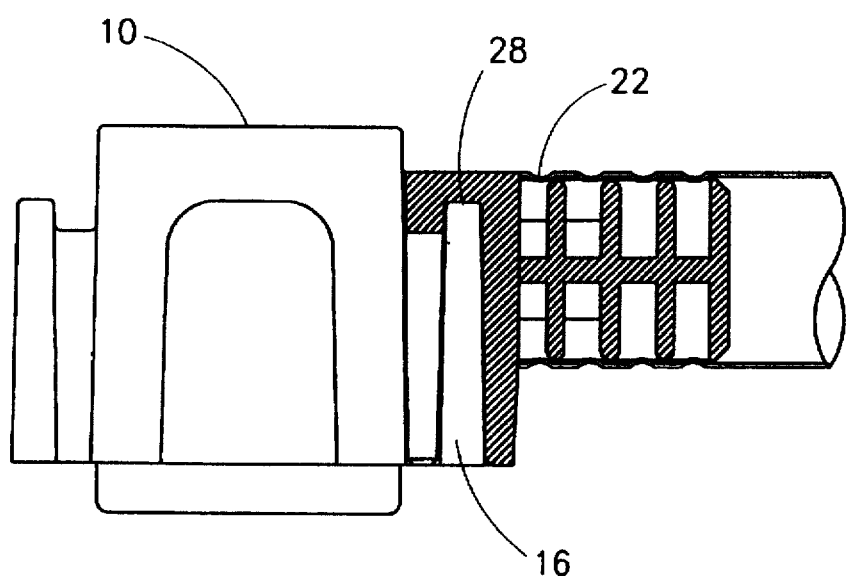
FIG. 4 illustrates the coupling of the adapter of FIG. 3 to the connector of FIG. 2.

An adapter 22 inserted in the horizontal beam 6 is illustrated in FIG. 3. It comprises a cylindrical projection 24 extending from a shoulder 26. The projection 24 has a diameter slightly smaller than the inner diameter of the horizontal beam 6, so that it can be inserted into the ends of the beam, as illustrated in the figure. The adapter will usually be secured to the beam by inserting the projection into the end of the beam and compressing the beam end around the projection. This is done under pressure in the factory, so that the beams are sold with the adapters already inserted in their ends. The adaptors can also be secured to the beams by other means such as screws, glue or compression bolts. A slot 28 in the shoulder 26 is dimensioned so as to be tightly mounted on the ear 16 of the connector 10, as illustrated in FIG. 4.

Figure 5:
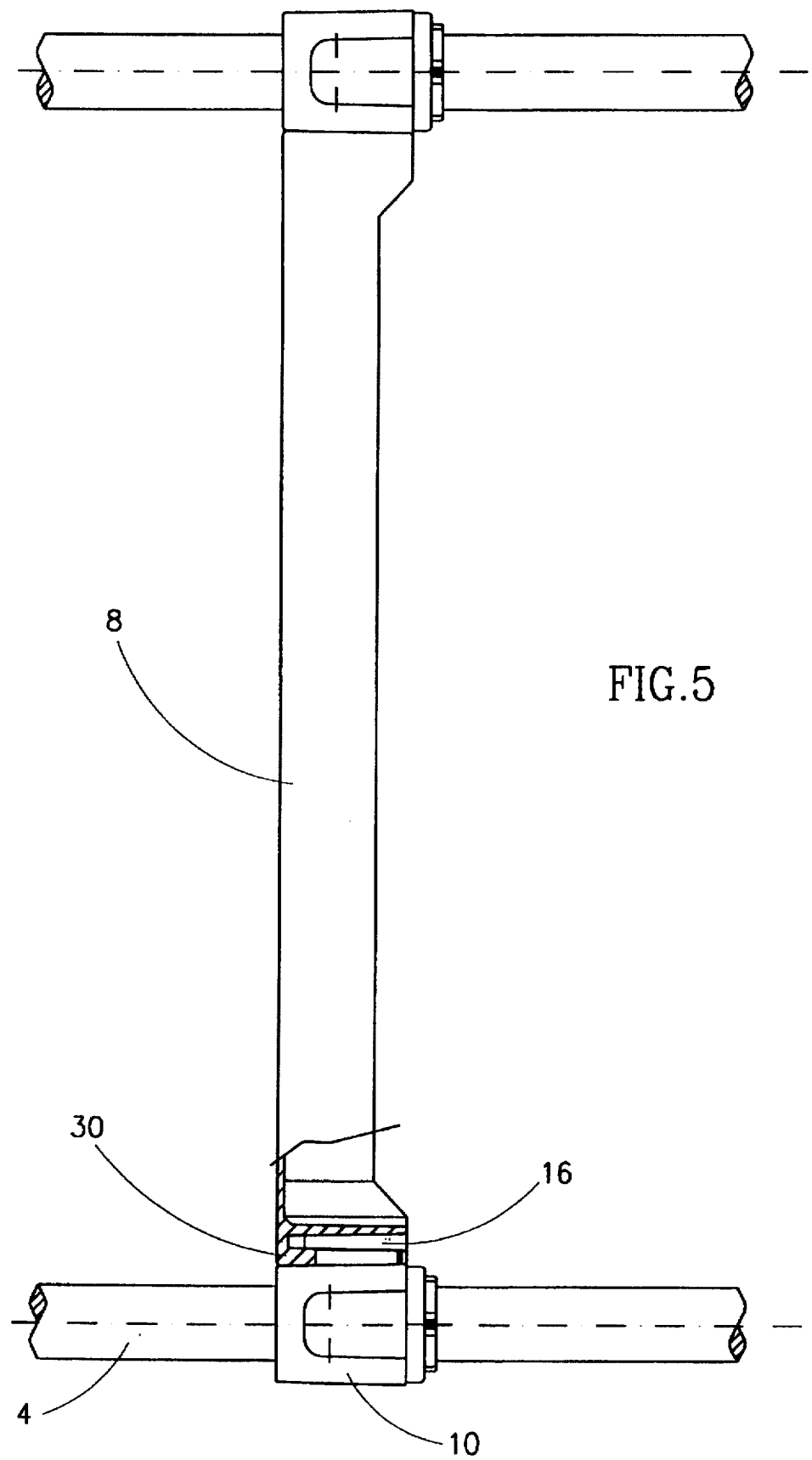
FIG. 5 is a partial side view of the shelving system, with part of the horizontal brace cut away.

FIG. 5 illustrates the connection between the side horizontal brace 8 and the connector 10. Referring to the cut-away left end of the brace 8, there is shown a hook-like fastener 30 integral to the brace, coupled to the ear 16 of the connector. It can thus be seen that both the shoulder 26 of the adapter 22 (FIG. 4) and the fastener 30 of the brace 8 are coupled to the ears 16 of the connector by lowering them onto the ears. This is advantageous in situations where it is desired to replace the horizontal beams. There is no need to dismantle the entire shelving, but rather the beams are simply lifted up and removed, and the new beams are inserted.

Figure 6:
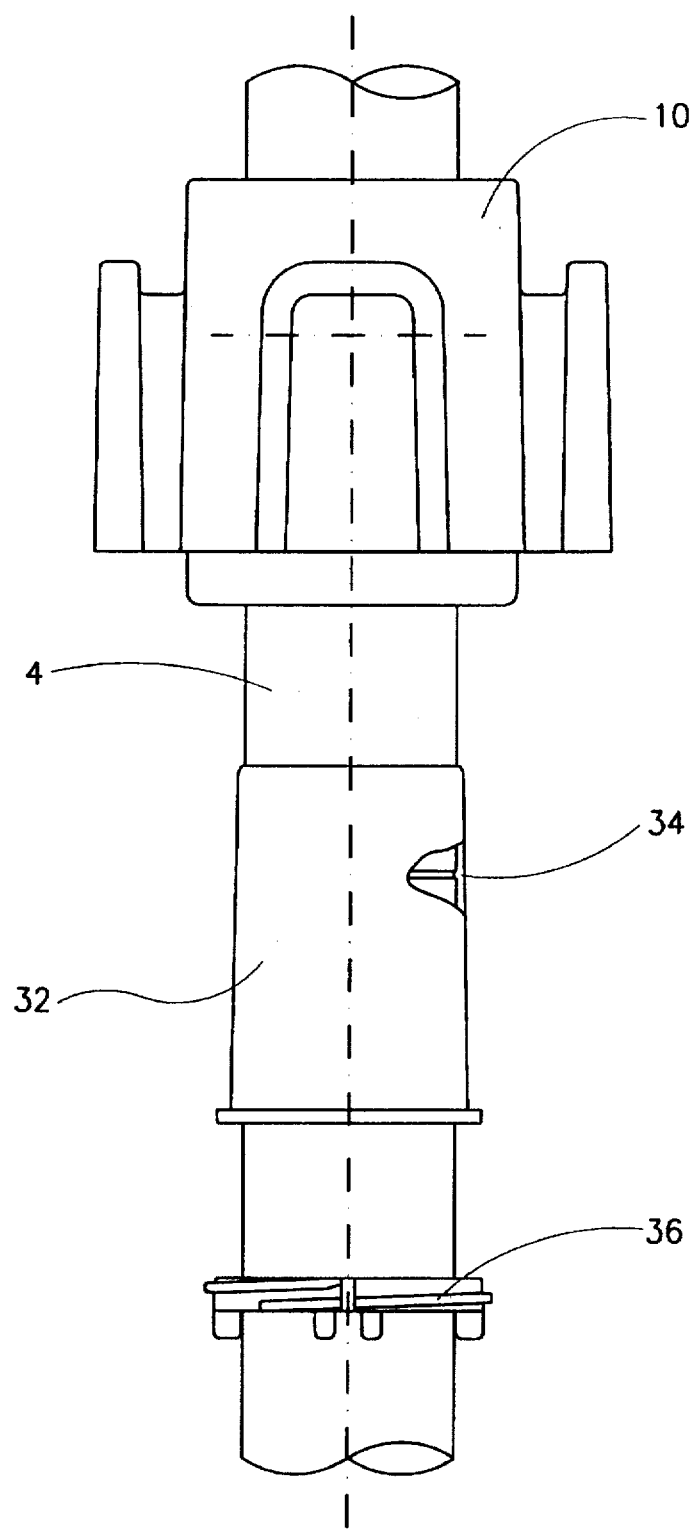
FIG. 6 is a plan view of a connector, split sleeve and nut mounted on a verticle post.

FIG. 6 illustrates how the connector 10 is mounted on the post 4 in a preferred embodiment. A split sleeve 32, is placed at a height on the post where it is desired to position the shelves. In a preferred embodiment, the post has annular grooves 34 at spaced intervals along the length of the post, and the split sleeve has a corresponding annular projection (not shown) around the inner circumference of the sleeve. The sleeve is placed so that the projection sits in the groove. The connector 10 is then mounted on the post and lowered onto the sleeve so that the sleeve enters the axial bore of the connector. The grooves 34 act in counterbalance to the connector as it is tightened on the sleeve, allowing the connector to be fixedly engaged to the post by the sleeve. The grooves also contribute to supporting the weight of the shelves, and stabilize the shelves from vibrations.

The connector can be further clamped in place by screwing on a nut 36 to the bottom side of the connector. The nut provides a counterbalance to the connector when it is desired to remove a shelf piece or horizontal beam by applying to them upwardly-directed blows.

Figure 7A:
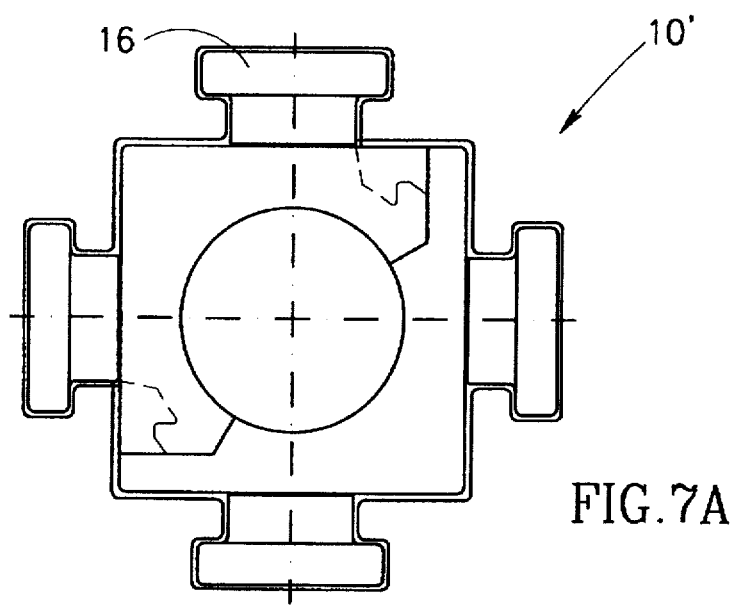
FIGS. 7a and 7b are top sectional views of an alternate embodiment of a connector.
Figure 7B:
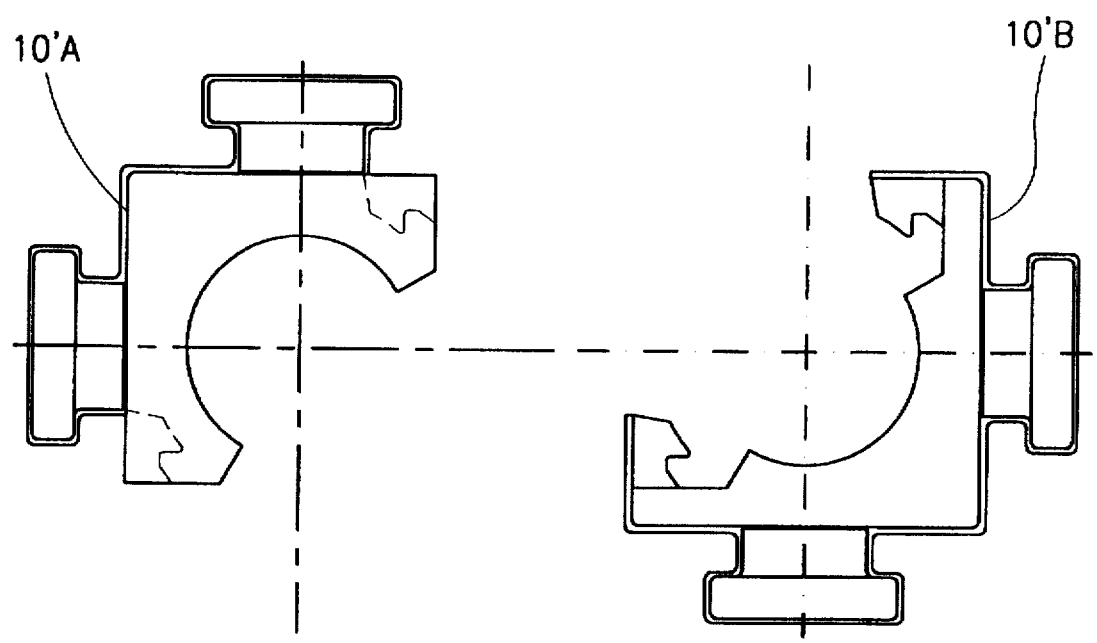

The connector can be mounted on the post in other ways, as is well known to the skilled man of the art. For example, the connector can be screwed or bolted onto the post, thus obviating the need for a conical bore and sleeve, as in the embodiment described above. Another variation is illustrated in FIGS. 7a and 7b, which show a split connector 10'. The two lateral sections 10'a & 10'b of the connector are simply coupled together on the post, so as to function as a whole connector. This type of connector can be used with a split sleeve and a split nut, thus allowing replacement of a connector without necessitating displacement of other connectors above or below it.

Figure 8:
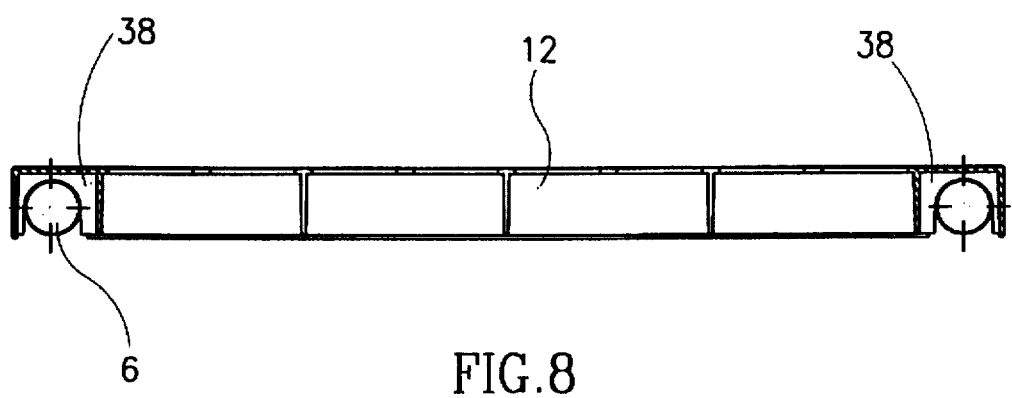
FIG. 8 is a sectional view through line VIII—VIII of FIG. 1.

After the horizontal braces and beams are assembled on the vertical posts, the shelf pieces are placed on the beams as illustrated in FIG. 1. FIG. 8 shows a shelf piece 12 with inverted U-shaped hooks 38 on either end supported by the horizontal beams 6. The shelf pieces can be easily placed and removed without the need of tools.

Figure 9:
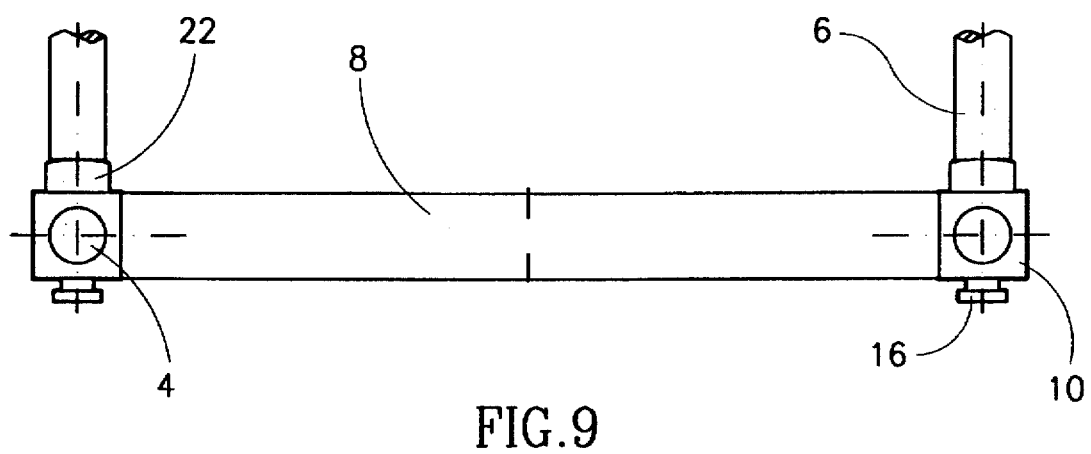
FIG. 9 is a top view through line IX—IX of FIG. 1.

FIG. 9 illustrates a side horizontal brace 8 coupled by connectors 10 to two vertical posts 4. Horizontal beams 6 extend from the connectors perpendicularly to the brace. It can be seen that the width of the brace is substantially equal to the widths of the connectors. This allows a shelf piece to be positioned contiguously to the side brace 8. Thus there is no need for having different types of shelf pieces, since the pieces positioned near the posts do not have to 'wrap around' them.

Figure 10:
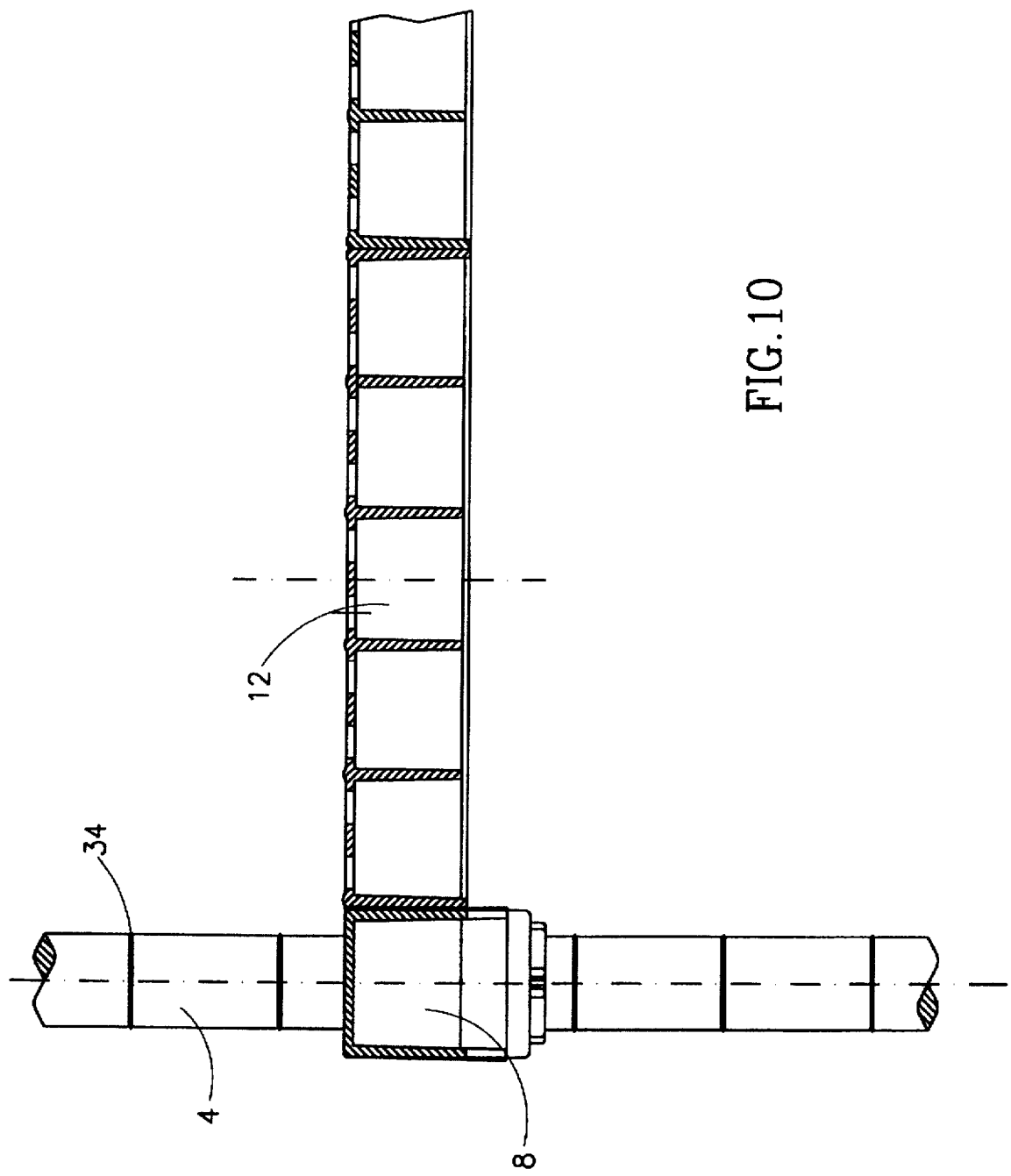
FIG. 10 is a sectional view through line X—X of FIG. 1.

In a preferred embodiment, the height of the side horizontal braces 8 when coupled to the connectors is substantially equal to the height of the shelf pieces 12 when positioned on the horizontal beams, as illustrated in FIG. 10. In another preferred embodiment, the height of the connectors 10 when mounted on the vertical posts 4 is substantially equal to the height of the side horizontal braces 8 when coupled to the connectors, as illustrated in FIG. 5. In a most preferred embodiment, the heights of the connectors, braces and shelf pieces are all substantially equal, thus forming a uniform, continuous shelf surface within and between units, as illustrated in the three levels of shelves in the system of FIG. 1. Other systems usually obtain this effect by combining several elements, such as connectors, horizontal beams and shelf pieces, into one integral unit. However, this results in less interchangeability between elements of the system. The advantage of the system of the invention is that the uniform, continuous shelf surface is obtained while each element remains independent, thus retaining the versatility of the system.

Figure 11:
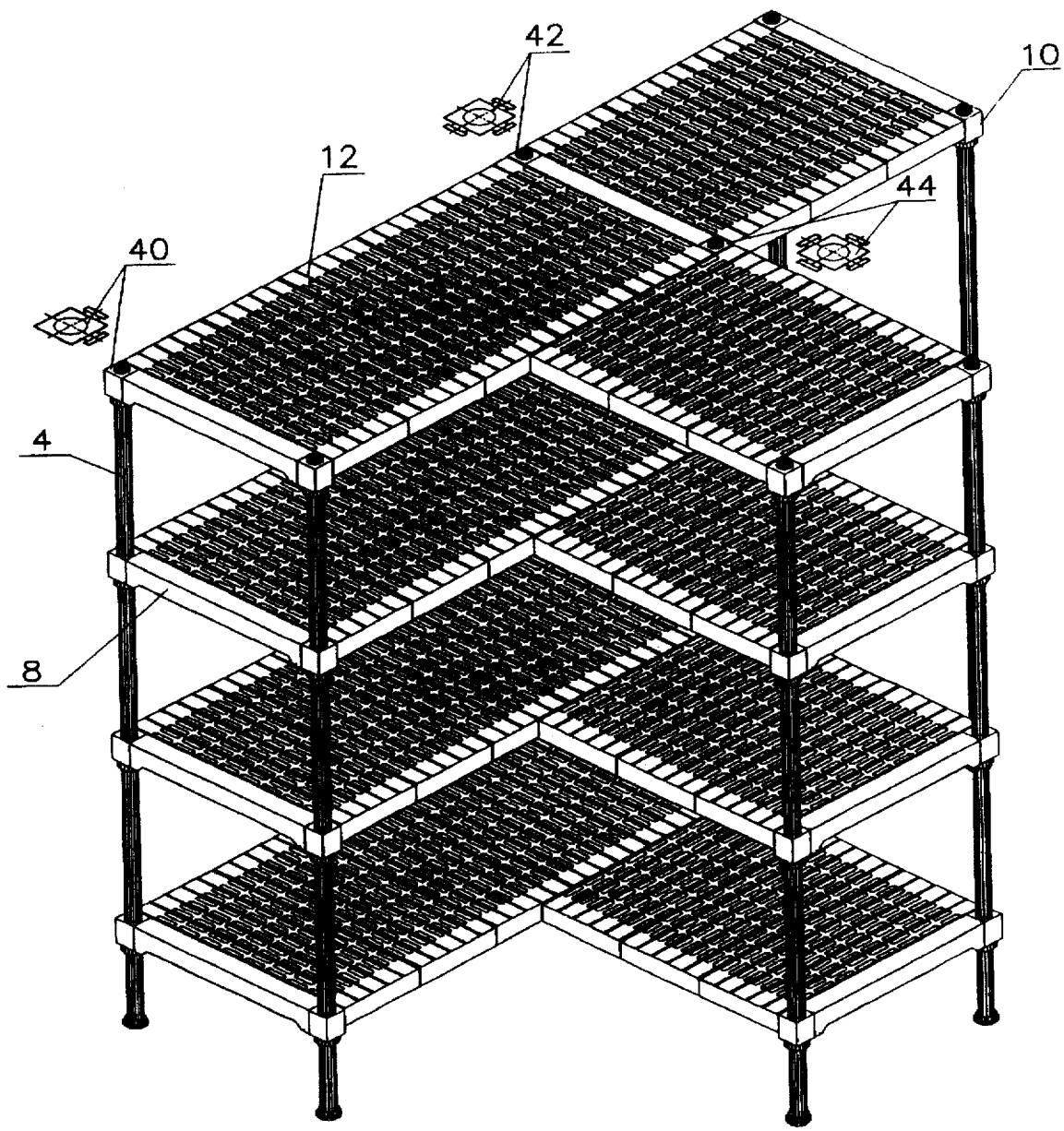
FIG. 11 is a perspective view of an extended shelving system according to the present invention.

FIG. 11 illustrates a shelving system according to an embodiment of the present invention comprising several units extending in various directions. This result is obtained by the use of connectors having two (40), three (42) and four (44) ears. This demonstrates the exceptional versatility and adaptability of the system of the invention.

In the event that a first unit is positioned perpendicularly to a second unit, as in the system illustrated in FIG. 11, the horizontal beams 46 of the first unit may be perpendicularly attached to the intermediate area of the beams 48 of the second unit by various methods.

Figure 12A:
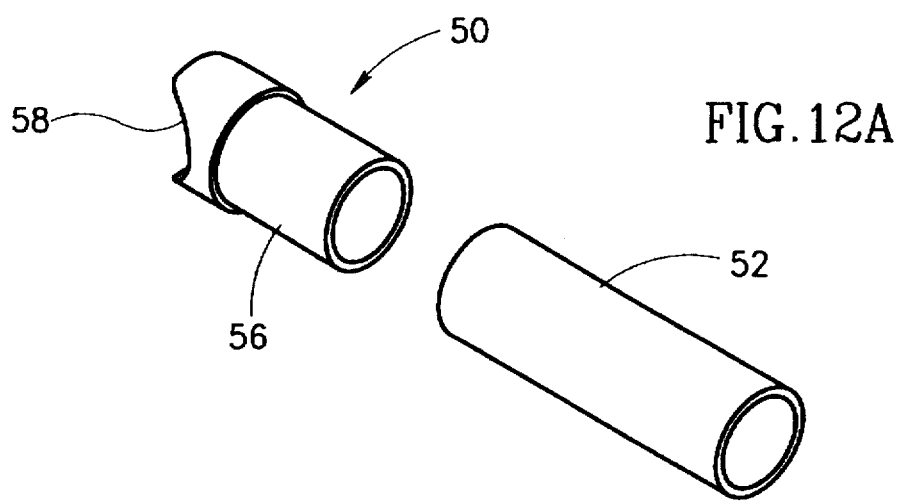
FIGS. 12a–c, 13a–b and 14a–b are perspective views illustrating various methods for attaching perpendicularly positioned horizontal beams of the shelving system of FIG. 11.
Figure 12B:
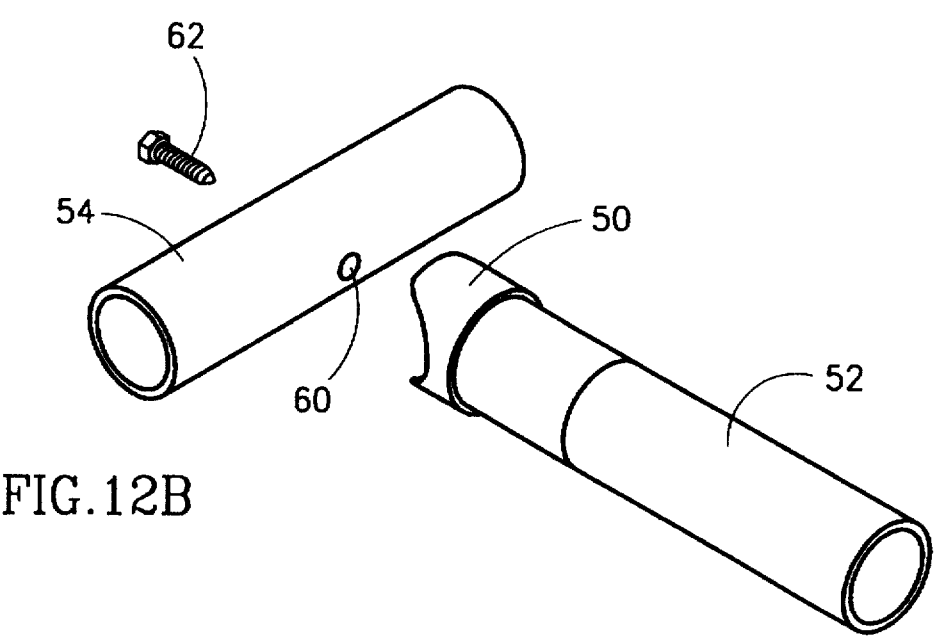
Figure 12C:
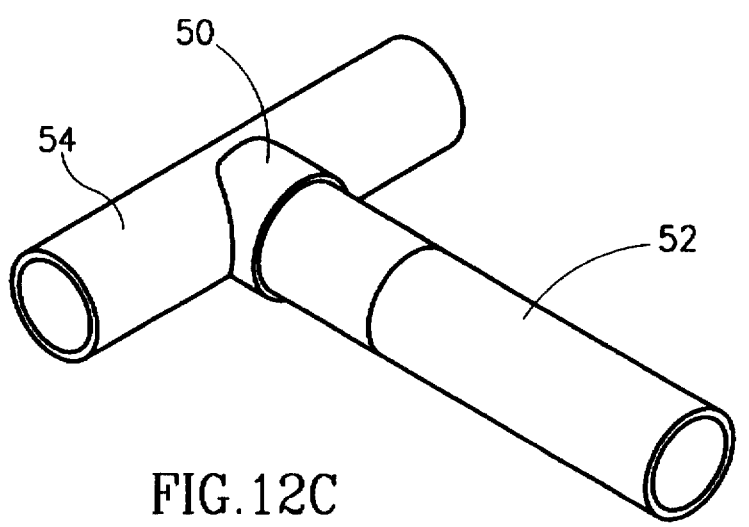

One method is illustrated in FIGS. 12a–c. A coupler 50 is used to connect between the end of a first horizontal beam 52 and the intermediate area of a perpendicularly placed second horizontal beam 54. The coupler 50 comprises a short cylinder 56 having an outer diameter slightly smaller than the inner diameter of the first beam 52. A short, cut-away cylinder 58 whose outer diameter is equal to that of the first beam 52 is attached to one end of the cylinder 56. The outer end of the cylinder 58 is cut-away in a semi-elliptical shape so that it can be mounted on the outer circumference of the second beam 54.

The coupler is secured to the end of the first beam 52 by inserting the short cylinder 56 into the end of the beam until the cut-away cylinder 58 abuts the end of the first beam. The beam end is then compressed around the coupler, as was done with the projection of the adapter 22 (see FIG. 3). The opposite end of the coupler has a screw thread or nut (not shown) fixed in the center of the cut-away cylinder 58. Two corresponding holes 60 are drilled through the wall of the second beam 54 along its diameter, and a screw 62 is inserted through the holes 60 and screwed into the screw thread or nut to secure the second beam to the end of the first beam.

Figure 13A:
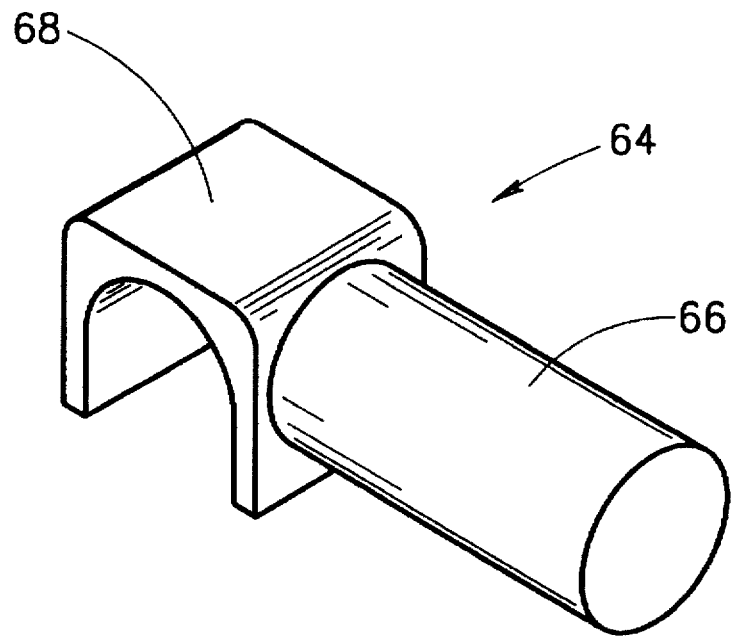
Figure 13B:
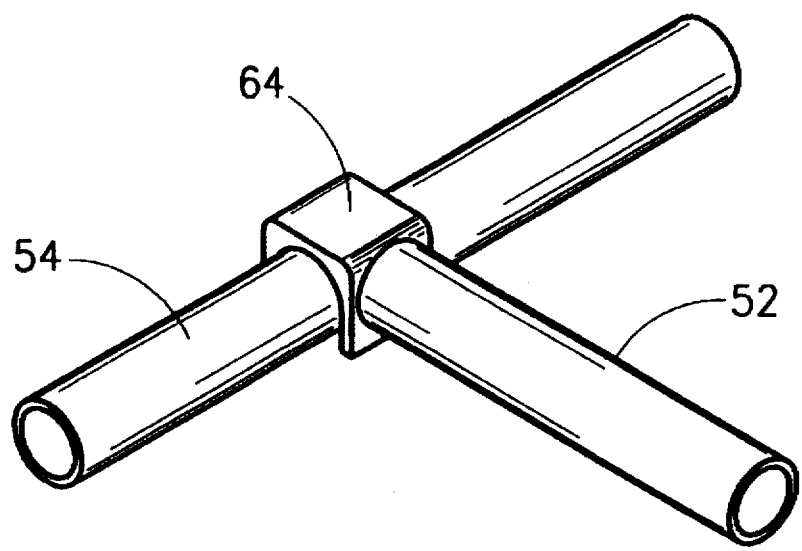

FIGS. 13a–b illustrate a second method for attaching two perpendicularly placed beams. In this method, the coupler 64 comprises a short cylinder 66 similar to that of the coupler of FIG. 12. The cylinder is inserted into the end of a first beam 52 as described above. In this method, however, the cylinder projects from the lateral wall of an inverted U-shaped coupling member 68. The inner diameter of the member is similar in size to the outer diameter of the beam 54, so that it can be securely mounted on the circumference of the beam.

Figure 14A:
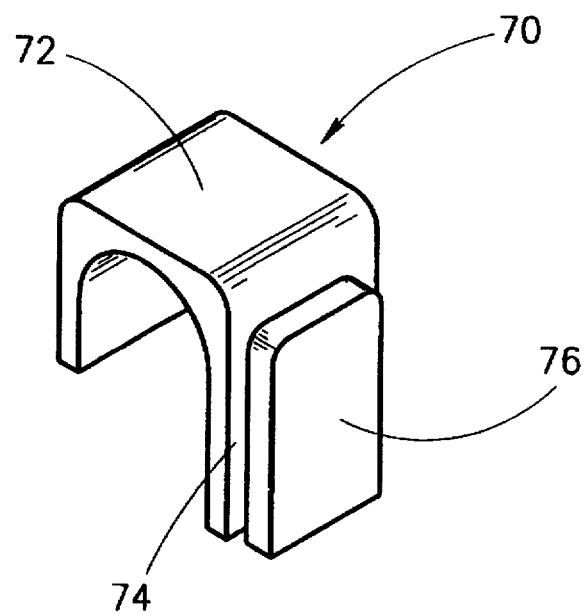
Figure 14B:
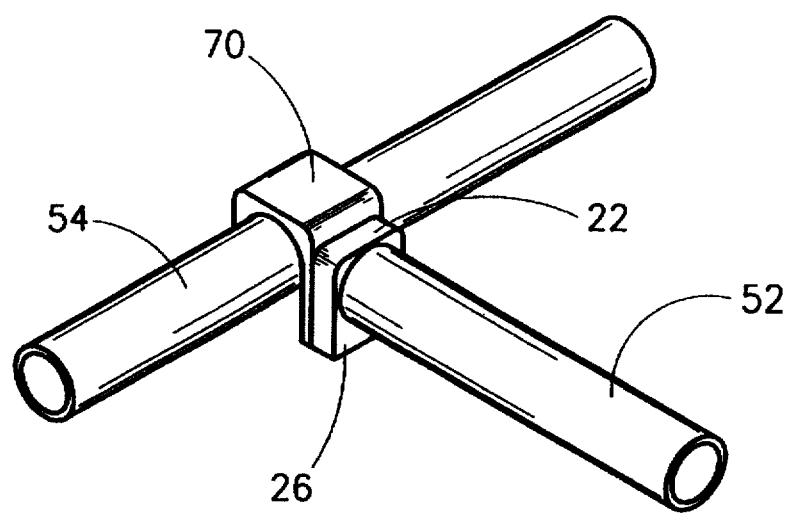

In the two methods described above, a special dedicated beam for the perpendicular attachment of shelving units will usually be manufactured with the coupler inserted in one end under pressure. This somewhat limits the modularity of the system. In the preferred method illustrated in FIGS. 14 a–b, the adapter 22 which was described above (and illustrated in FIGS. 3 & 4) is used for the perpendicular attachment of shelving units.

The coupler 70 used in this method comprises an inverted U-shaped coupling member similar to that illustrated in FIG. 13a, but having one extended lateral wall 74 slightly longer than the height of the shoulder 26 of the adapter 22. An ear 76 projects from the outer surface of the extended wall 74, similarly to the ears 16 projecting from the connector 10 (see FIG. 2). The adapter 22 is inserted into the end of a horizontal beam 52, as was described above (FIG. 3). The member 70 is mounted on the circumference of the beam 54, and the shoulder 26 of the adapter 22 is mounted on the ear 76 of the member, as described above with respect to the connector 10 (see FIG. 4).

The advantage of this preferred method is that a beam having an adapter inserted in its end can be used both for attachment to the end of a second beam (by the connector) as well as for attachment to the intermediate area of a second beam (by a coupler). It will be understood by the skilled man of the art that methods of attachment other than those described above may also be used.

Figure 15:
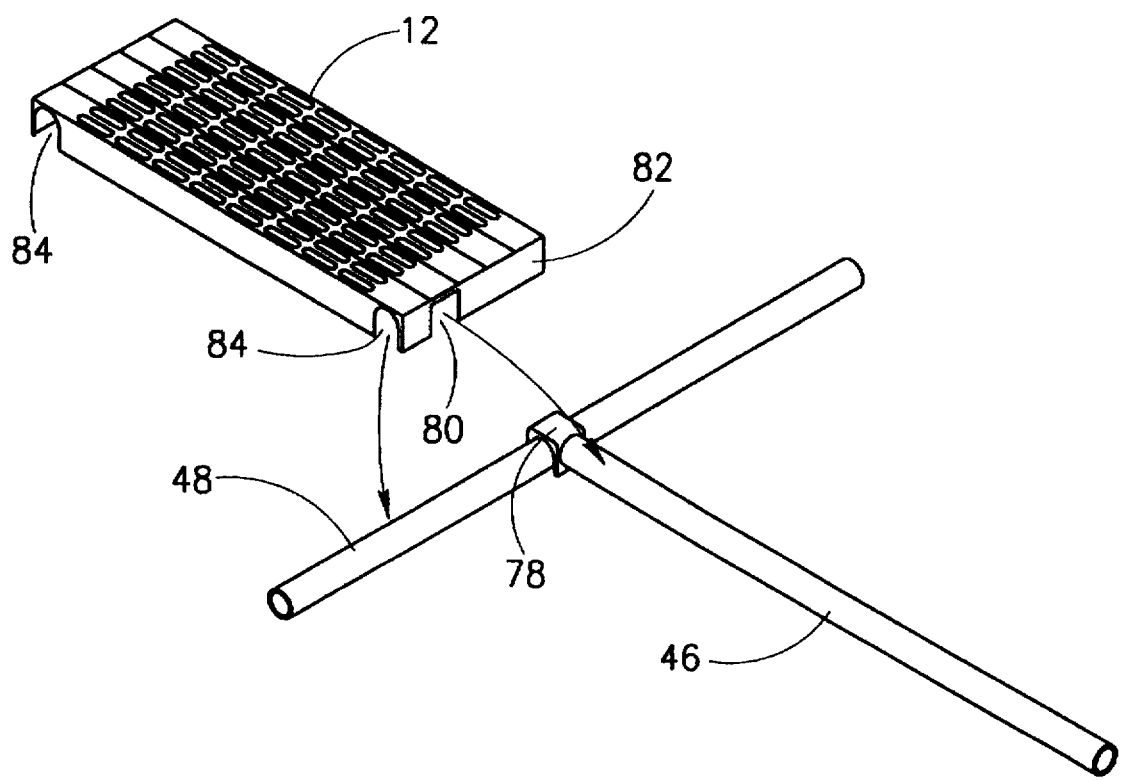
FIG. 15 is a perspective view which illustrates the placement of a shelf piece in the shelving system of FIG. 11.

The manner in which a shelf piece 12 can be mounted on a perpendicular attachment site 78 as described above, is illustrated in FIG. 15. A small slot 80 is cut in the vertical overhanging widthwise rim 82 of the shelf piece 12, at the location on the rim which will be mounted on the end of the beam 46 adjoining the attachment site 78. This slot 80 is in addition to the slots 84 which are routinely cut in the ends of the lengthwise rims of the shelf piece. The shelf piece is then mounted on the horizontal beam 48 with the end of the perpendicular horizontal beam 46 inserted through the slot 80.

Various modifications of the invention in addition to those shown and described herein will become apparent to those skilled in the art. The scope of the invention is therefore not to be construed as limited by the illustrative embodiments set forth herein, but is to be determined in accordance with the appended claims.

I claim:

1. A modular shelving system comprising:
   vertical posts;
   horizontal beams;
   side horizontal braces;
   connectors capable of being mounted on said vertical posts and having ears protruding from the sides of the connector, said ears capable of being coupled to said horizontal beams and braces; and
   shelf pieces which are placed on said horizontal beams; wherein the width of said side horizontal brace is substantially similar to the width of said connector, and adapters receivable at the ends of said horizontal beams for coupling said beams to the ears of said connectors.

2. A system according to claim 1 wherein said connectors have a slightly conical inner bore through which said vertical posts are inserted.

3. A system according to claim 2 further comprising sleeves which are mounted on said vertical posts so that said connectors can be mounted on said sleeves thereby fixedly engaging said connectors to said posts.

4. A system according to claim 3 wherein said vertical posts have annular grooves for engaging said sleeves.

5. A system according to claim 1 further comprising nuts capable of being attached to the bottom side of said connectors, and which are mounted on said vertical posts under said connectors.

6. A system according to claim 3, wherein said sleeves are longitudinally split thereby enabling lateral mounting of said sleeves onto said posts.

7. A system according to claim 1 wherein said adapters are secured to said horizontal beams by compression.

8. A system according to claim 1 wherein said horizontal braces have fasteners at either end for coupling said braces to the ears of said connectors.

9. A system according to claim 1 wherein said adapters are slidably mounted onto the ears of said connectors.

10. A system according to claim 1 wherein said shelf pieces have ventilation slits on their upper surfaces.

11. A system according to claim 1 comprising two or more shelving units.

12. A system according to claim 11 wherein a first shelving unit is positioned perpendicularly to a second shelving unit, said system further comprising a coupler capable of connecting between the end of a first horizontal beam of said first shelving unit and the intermediate area of a perpendicurlarly placed second horizontal beam of said second shelving unit.

13. A system according to claim 12 wherein each of said adapters is capable of being coupled to said coupler.

14. A system according to claim 1 wherein the components of said system are made from plastic and/or metal materials.

15. The system according to claim 5 wherein said nuts are longitudinally split thereby enabling lateral mounting of said nuts onto said posts.

16. The system according to claim 8 wherein said fasteners are slidably mounted onto said ears of said connectors.

17. A modular shelving system comprising:
    vertical posts;
    horizontal beams;
    side horizontal braces;
    connectors capable of being mounted on said vertical posts and having ears protruding from the sides of the connector, said ears capable of being coupled to said horizontal beams and braces;
    shelf pieces which are placed on said horizontal beams; wherein the width of said side horizontal braces are substantially similar to the width of said connector; and wherein said connector includes two lateral sections which when assembled functions as one unit.

* * * * *